United States Patent [19]

Chen et al.

[11] Patent Number: 4,481,084
[45] Date of Patent: Nov. 6, 1984

[54] ANODIZATION OF ALUMINUM ELECTROLYTE CAPACITOR FOIL

[75] Inventors: Chia-Tien Chen, Williamstown, Mass.; Gudrun Hutchins, Pownal, Vt.

[73] Assignee: Sprague Electric Company, North Adams, Mass.

[21] Appl. No.: 600,239

[22] Filed: Apr. 16, 1984

[51] Int. Cl.$^3$ .............................................. C25D 11/12
[52] U.S. Cl. ....................................... 204/42; 204/28; 204/58
[58] Field of Search ............................. 204/42, 28, 58

[56] References Cited

U.S. PATENT DOCUMENTS

| | | | |
|---|---|---|---|
| 4,113,579 | 9/1978 | Randall et al. | 204/42 |
| 4,437,945 | 3/1984 | Sells et al. | 204/42 |
| 4,437,946 | 3/1984 | Bernard | 204/42 |

Primary Examiner—R. L. Andrews

[57] ABSTRACT

In order to increase the crystalline oxide content of barrier layer oxide and hence its capacitance, aluminum electrolytic capacitor foil is anodized at an average current density of at most 3 mA/cm$^2$ of effective surface area in an aqueous electrolyte of $C_4$ to $C_7$ unsubstituted aliphatic dicarboxylic acid containing 0 to 0.05 wt. % of citric acid or tartaric acid and preferably at a temperature above 70° C. The anodized foil is subjected to a relaxation and reanodization treatment to stabilize the foil. The anodization at low current density promotes high crystalline oxide content of the barrier layer oxide, and the relaxation and reanodization insure a stable barrier layer oxide of increased capacitance.

13 Claims, No Drawings

ANODIZATION OF ALUMINUM ELECTROLYTE CAPACITOR FOIL

BACKGROUND OF THE INVENTION

This invention relates to the anodization of aluminum electrolytic capacitor foil at low current density to obtain a barrier layer oxide with a high degree of crystallinity and increased capacitance. More particularly it relates to a process carried out at an average current density of 20 $\mu$A/cm$^2$ to 3 mA/cm$^2$ of effective surface area in a aqueous solution of a C$_4$ to C$_7$ unsubstituted aliphatic dicarboxylic acid containing 0 to 0.05 wt. % of citric or tartaric acid followed by one or more relaxation and reanodization treatments.

Crystalline barrier layer oxide can be produced by anodizing aluminum in citric, tartaric or boric acid anodizing electrolytes. Unfortunately, citric acid and tartaric acid are both fairly aggressive acids and will start dissolving the oxide formed. Both electrolytes are relatively inefficient anodizing electrolytes and have a slow formation rate, e.g. less than 10 V/min at a current density of 1 mA/cm$^2$. This results in a longer anodization time and increased power consumption.

Other organic acids, particularly unsubstituted aliphatic dicarboxylic acids, are more efficient anodization electrolytes, but heretofore they have not been known to produce any significant amount of crystalline oxide. The amount of crystalline oxide is associated with higher capacitance and also with oxide instability unless the oxide is properly relaxed and reanodized. Amorphous oxide is stable without relaxation and reanodization, but it is of a lower capacitance.

It would be desirable to be able to form a barrier layer oxide with increased crystallinity in an efficient anodization electrolyte and to be able to stabilize the oxide so it can sustain the formation voltage.

SUMMARY OF THE INVENTION

It is a feature of this invention to promote crystalline oxide formation during the anodization of aluminum electrolytic capacitor foil in an efficient anodization electrolyte. To this end, anodization is carried out in an aqueous electrolyte of C$_4$ to C$_7$ unsubstituted aliphatic dicarboxylic acid containing 0 to 0.05 wt. % of citric or tartaric acid at an average current density of 20 $\mu$A/cm$^2$ to 3 mA/cm$^2$ of effective surface area. The temperature of the electrolyte is 25° C. or above and preferably is 70° C. to 100° C. The C$_4$ to C$_7$ aliphatic dicarboxylic acid is the main electrolyte and is chosen for its anodization efficiency, e.g. an anodization rate of greater than 20V/min at a current density of 1 mA/cm$^2$. It should not be aggressive with respect to aluminum and its anodic oxide and is preferably adipic, glutaric, succinic, or pimelic acid. Its concentration should be 0.1 to 6 wt. %, and preferably 3 wt. %, of the aqueous solution. Mixtures of the C$_4$ to C$_7$ aliphatic dicarboxylic acids are also effective; their total concentration should be 0.1 to 6 wt. %, and preferably 3 wt. %, of the aqueous solution.

The pH of the electrolyte is adjusted to a value of between 4 and 8, and preferably 6, by a basic reagent, e.g., with ammonium hydroxide. It is desirable to keep the pH within this range, that is around neutral, so the solution will not attack the foil or oxide as it will under more acidic and more basic conditions. The preferred electrolyte temperature during the anodization should be between 70° C. and just under the boiling point, e.g., 98° C. and is most preferably 85° C.

The C$_4$ to C$_7$ acids are the preferred acids of the known C$_2$ to C$_{10}$ anodizing acids. The C$_2$ and C$_3$ acids (oxalic and malonic) have high first dissociation constants and are too aggressive for use on etched foil. The C$_8$ to C$_{10}$ acids are not as readily available and are more expensive than the C$_4$ to C$_7$ acids which are therefore the preferred ones for practical reasons.

The low current density promotes crystalline oxide formation during anodization in aqueous solutions of the above acids. The low current density can be obtained practically by using more than one power source during anodization. The current density is proportional to the formation voltage divided by the resistance of the system times an exponential factor which is essentially constant for a given system. By dividing the formation voltage among multiple power supplies, the desired average current density can be obtained. Alternatively, the length of the anodization zone may be increased to reduce the average current density. The preferred current density range is 20 $\mu$A/cm$^2$ to 3 mA/cm$^2$ of the effective surface area to promote crystalline oxide formation.

While the addition of the citric or tartaric acid helps to promote crystalline oxide formation during anodization, the chief contribution of the additive is to decrease the relaxation time of the anodized film. Both citric and tartaric acids are aggressive and, as anodization proceeds, tend to dissolve the oxide which is formed. For this reason the amount of either is kept as low as possible to promote crystalline oxide formation while keeping dissolution low so that only amorphous oxide, which is preferentially attacked, is dissolved. It was found that concentrations of 0.005 to 0.05 wt. %, and preferably 0.01 wt. % meet these conditions.

A high degree of crystallinity is desirable as it is associated with a thinner barrier layer oxide and higher capacitance. Parameters that favor crystalline oxide formation, along with anodization at low current densities, are high electrolyte temperature and high formation voltage. The presence of crystalline anodic oxide can be confirmed by transmission electron diffraction patterns of the isolated anodic oxide film. The size, shape, and distribution of the crystals can be observed in transmission electron micrographs. Unfortunately, the greater the degree of crystallinity, the greater the instability of the foil. The barrier layer oxide must be relaxed and reanodized to stabilize it.

Ease of relaxation has been found to depend upon the anodization (formation) voltage, current density, and the electrolyte composition and temperature. For a given electrolyte and a low current density, a high anodization voltage and a high electrolyte temperature result in a more crystalline oxide and a thinner amorphous layer. The less amorphous material is present, the easier the relaxation process is. The presence of the small amount of citric or tartaric acid in the anodization electrolyte dissolves some of this amorphous oxide and reduces its thickness leading to easier relaxation.

At a given anodization temperature, voltage and current density, thermal relaxation is not as effective as is the presence of citric or tartaric acid in the electrolyte. However, foils anodized to less than approximately 150V by the present process, even with the citric or tartaric acid addition in the electrolyte, require thermal relaxation also. Depending upon the formation voltage and the amount of amorphous oxide present, one or more relaxation steps may be required. After complete relaxation and reanodization the foil is stabilized.

The thermal relaxation is carried out between 400° C. and 550° C. If a film is relaxed, there will be a current flow during reanodization. When thermal relaxation is carried out below 400° C., there is minimal relaxation as shown by little, if any, current flow during reanodization. When the thermal relaxation is carried out above 550° C., there is a large current flow during reanodization, but leakage current increases after reanodization which is an indication that the oxide film has been damaged.

In summary, formation of crystalline oxide can be increased during anodization in an efficient anodization electrolyte by carrying out the anodization at a current density of at most 3 mA/cm$^2$ of effective surface area, and preferably at an electrolyte temperature above 70° C. The foil is relaxed in air or by one or more thermal treatments between 400° and 550° C. After the foil is reanodized to heal any defects in the barrier layer oxide, no further instability will occur.

When hydration resistance is desired, as is frequently the case with aluminum electrodes, the final reanodization step or a separate anodization step with an incremental increase in the formation voltage is carried out in a standard phosphate electrolyte. This phosphate electrolyte is preferably an aqueous solution of ammonium or sodium dihydrogen phosphate and confers hydration resistance to the anodized foil.

As is frequently customary, the foil may be pretreated before anodization by a thermal oxidation step. This pretreatment further increases the anodization efficiency, the degree of crystallinity and the capacitance.

DESCRIPTION OF THE PREFERRED EMBODIMENTS

In the following examples, an estimated percent crystalline oxide content of the barrier layer oxide is presented. A series of barrier layer oxide films were treated with a standard phosphoric-chromic acid stripping solution which preferentially dissolves amorphous oxide. The amount of crystalline oxide remaining was measured with a microprobe. The capacitance of the original sample was graphed versus the measured crystallinity of the sample to obtain a curve of capacitance vs percent crystalline oxide. The estimated percent crystalline oxide values below were obtained by measuring the capacitance and obtaining the corresponding crystalline oxide content from the curve.

In order to measure the crystalline oxide content accurately, most of the anodization experiments were performed using smooth electro-polished foil, and the resulting capacitance values reflect this as they are about 100 times smaller than that obtained with etched foil with its higher surface area and higher capacitance.

EXAMPLE 1

Electro-polished foil was anodized in a 3% glutaric acid electrolyte at pH 6 180V at a current density of 1 mA/cm$^2$ over a temperature range of 20° C. to 92° C. The results, together with the estimated percent crystalline oxide, are shown in the table below.

TABLE 1

| Sample Number | Formation Temperature | Capacitance ($10^{-2} \mu F/cm^2$) | Est. Percent Crystallinity |
|---|---|---|---|
| 1 | 20° C. | 3.23 | <10% |
| 2 | 25° C. | 3.14 | <10% |

TABLE 1-continued

| Sample Number | Formation Temperature | Capacitance ($10^{-2} \mu F/cm^2$) | Est. Percent Crystallinity |
|---|---|---|---|
| 3 | 30° C. | 3.16 | <10% |
| 4 | 35° C. | 3.15 | <10% |
| 5 | 40° C. | 3.23 | <10% |
| 6 | 45° C. | 3.28 | 13% |
| 7 | 50° C. | 3.40 | 18% |
| 8 | 55° C. | 3.47 | 21% |
| 9 | 60° C. | 3.65 | 30% |
| 10 | 65° C. | 3.78 | 36% |
| 11 | 70° C. | 3.94 | 43% |
| 12 | 75° C. | 4.16 | 53% |
| 13 | 80° C. | 4.37 | 63% |
| 14 | 85° C. | 4.44 | 66% |
| 15 | 92° C. | 4.67 | 76% |

As the formation (anodization) temperature increased, so did the crystallinity with the largest incremental increases occuring at 70° C. and above.

EXAMPLE 2

This example shows the effect of current density on the amount of crystalline oxide formed. Electro-polished foil was anodized to 180V at 80° C. in 3 wt. % adipic or glutaric acid, both at pH 6. Capacitance is in $10^{-2} \mu F/cm^2$ and current density is in mA/cm$^2$

TABLE 2

| Electrolyte | Current Density | | | | |
| | 3.0 | 1.2 | 0.6 | 0.3 | 0.1 |
|---|---|---|---|---|---|
| Adipic Acid | | | | | |
| Cap. | 4.18 | 4.43 | 4.53 | 4.75 | 4.93 |
| % Cryst. | 53 | 65 | 70 | 80 | 88 |
| Glutaric Acid | | | | | |
| Cap. | 4.08 | 4.34 | 4.55 | 4.75 | 4.89 |
| % Cryst. | 49 | 61 | 71 | 80 | 86 |

As current density was decreased, both capacitance and estimated percent crystalline oxide increased. The same trend was observed for a 30V anodization in the adipic acid electrolyte at 85° C. where the capacitance and estimated percent crystallinity increased from 16.68 $10^{-2} \mu F/cm^2$ and 10%, respectively, at 3 mA/cm$^2$ to 21.71 $10^{-2} \mu F/cm^2$ and 54% at 0.01 mA/cm$^2$.

EXAMPLE 3

This example shows the effect of adding a small amount of citric acid to adipic acid and to a mixture of adipic and glutaric acids. Electrolyte A is 3 wt. % adipic acid, and electrolyte B is 3 wt. % adipic acid plus 0.1 wt. % citric acid. Both electrolytes were at pH 6 and electro-polished foil was anodized to the following voltages at 85° C. and 3 mA/cm$^2$.

TABLE 3

| | Voltage | | |
| | 60 | 120 | 180 |
|---|---|---|---|
| A, Capacitance | 10.38 | 6.33 | 4.54 |
| % Cryst. | 34 | 61 | 70 |
| B, Capacitance | 11.63 | 6.63 | 4.86 |
| % Cryst. | 55 | 70 | 85 |

A mixture of 1.5% adipic acid, 1.5% glutaric acid and 0.005% citric acid at pH6 was used at 90° C. to anodize electro-polished foil at 1 mA/cm$^2$ to 180V The capacitance was 4.60 $10^{-2} \mu F/cm^2$ and the estimated crystallinity was 73%. The addition of the citric acid did increase the amount of crystalline oxide formed; subsequent experiments on etched foil showed a similar increase but that the citric or tartaric acid concentration should not exceed 0.05 wt. %. However, the major effect of the acids is to promote ease of relaxation as shown in the next example.

EXAMPLE 4

The barrier layer oxides formed in glutaric acid (Example 2) at 1 mA/cm$^2$ and 0.1 mA/cm$^2$ were 60% and 86% crystalline, respectively. They required approximately 72 hrs and 20 hrs, respectively, to relax in air. However, when a small amount of citric acid (0.005 to 0.01 wt. %) was added to the adipic acid, glutaric acid, or the mixed adipic-glutaric acid electrolyte, the barrier layer oxide relaxed immediately in air even when the current density was 3 mA/cm$^2$ (approximately 50% crystalline oxide content).

It is believed that the small amount of citric acid, or alternately tartaric acid, dissolves some of the amorphous oxide during the anodization process, thinning it, and allowing the resulting barrier layer oxide to relax more easily.

Whatever the mechanism, the addition of small amounts of citric or tartaric acid to the anodizaiton electrolyte, particularly for the lower voltage formations (below approximately 150V) has proved beneficial in rendering the foil easier to relax and thus obtaining a stable foil economically.

EXAMPLE 5

AC etched capacitor foil was anodized in 3% adipic acid at pH 6 and a current density of less than 0.1 mA/cm$^2$ to 150V. One sample was thermally pretreated before anodization and one was not pretreated. The untreated foil had a capacitance of 10.80 $\mu$F/in$^2$ and was 50% crystalline, while the treated foil had a capacitance of 13.12 $\mu$F/in$^2$ and was 80% crystalline.

In summary, crystalline oxide content of barrier layer oxide for electrolytic capacitor use can be increased by carrying out the anodization in an efficient anodization electrolyte containing 0 to 0.05 wt. % citric or tartaric acid by carrying out the process at current densities between 20 $\mu$A/cm$^2$ and 3 mA/cm$^2$. When the foil is relaxed and reanodized, a stable anodized foil is obtained. Anodization temperature is preferable 70° to 100° C., and most preferably 85° C. Electrolyte pH should be between 4 and 8 and preferably is 6.

What is claimed is:

1. A process for increasing the capacitance of anodized aluminum electrolytic capacitor foil by electrolytically anodizing said foil at an average current density between 20 $\mu$A and 3 mA per cm$^2$ of effective surface area in an aqueous electrolyte consisting essentially of an unsubstituted aliphatic dicarboxylic acid containing 0 to 0.05 wt. % of an additive selected from the group of citric acid and tartaric acid to form a barrier layer oxide on said foil having an increased crystalline oxide content, and passing said foil through at least one relaxation and reanodization step to stabilize said foil.

2. A process according to claim 1 wherein there are more than one relaxation and reanodization steps and at last of said reanodization steps is carried out in an aqueous phosphate electrolyte.

3. A process according to claim 2 wherein said last reanodization step is a separate anodization step in said aqueous phosphate electrolyte and is carried out with an incremental increase in voltage.

4. A process according to claim 2 wherein said phosphate is selected from the group ammonium dihydrogen phosphate and monosodium dihydrogen phosphate.

5. A process according to claim 1 wherein said dicarboxylic acid is selected from the group of adipic, glutaric, succinic and pimelic acids and mixtures thereof.

6. A process according to claim 5 wherein 0.1 to 6 wt. % of said acid is present.

7. A process according to claim 5 wherein said dicarboxylic acid is a mixture of said acids and a total of 0.1 to 6 wt. % of said mixture is present.

8. A process according to claim 1 wherein said relaxation step is a thermal process at a temperature between 400° to 550° C.

9. A process according to claim 1 wherein the foil is etched foil.

10. A process according to claim 1 wherein said anodizing is carried out at a temperature of 70° to 100° C.

11. A process according to claim 10 wherein said temperature is 85° C.

12. A process according to claim 1 wherein the pH of said electrolyte is adjusted to between 4 and 8.

13. A process according to claim 12 wherein said pH is 6.

* * * * *

UNITED STATES PATENT AND TRADEMARK OFFICE
CERTIFICATE OF CORRECTION

PATENT NO. : 4,481,084
DATED : November 6, 1984
INVENTOR(S) : Chia-tien Chen et al It is certified that error appears in the above—identified patent and that said Letters Patent is hereby corrected as shown below:

Cover page, under "[56] References Cited"
the following U.S. patents should be listed:

-- 2,408,910   10/1946   Burnham    175/41
   3,767,541   10/1973   Curtis     204/56R
   3,796,644   3/1974    Bernard    204/58 -- the following foreign patents should be listed:
-- 1,564,666   7/1970    Fed. Rep. of Germany
     916,613   4/1982    U.S.S.R.   -- the following publication should be listed:
-- R. S. Alwitt et al, "Crystalline Aluminum Oxide Films", Passivity of Metals and Semiconductors, M. Froment, ed. Elsevier, Sci. Publi., Amsterdam (in press) --

Claim 2, line 2, "at" should read -- the --

Signed and Sealed this

Fourteenth Day of May 1985

[SEAL]

Attest:

DONALD J. QUIGG

Attesting Officer     Acting Commissioner of Patents and Trademarks